United States Patent [19]
Tsunoda et al.

[11] 4,391,097
[45] Jul. 5, 1983

[54] PUMPING UP HYDROELECTRIC POWER PLANT

[75] Inventors: Sachio Tsunoda, Yokohama; Kaneo Sugisita, Ayase, both of Japan

[73] Assignee: Tokyo Shibaura Denki Kabushiki Kaisha, Kanagawa, Japan

[21] Appl. No.: 204,036

[22] Filed: Nov. 4, 1980

[30] Foreign Application Priority Data

Nov. 7, 1979 [JP] Japan .................. 54/143291

[51] Int. Cl.³ .............................. F16D 31/02
[52] U.S. Cl. ........................... 60/398; 417/53
[58] Field of Search ................. 60/398; 417/53

[56] References Cited

U.S. PATENT DOCUMENTS 3,214,915 11/1965 Weibel ........................ 60/398
3,939,356 2/1976 Loane ........................ 290/52

Primary Examiner—A. Michael Chambers
Attorney, Agent, or Firm—Stevens, Davis, Miller & Mosher

[57] ABSTRACT

In a pumping up hydroelectric power plant including a main pump/turbine and a booster pump operable in series during the pumping operation of the main pump/turbine, time constants $K_1$ and $K_2$ for the pump/turbine and the booster pump, and average torques $\bar{y}_1$ and $\bar{y}_2$ for the same two machines are selected to satisfy relations $$(K_1/K_2)(\bar{y}_2/\bar{y}_1) \approx 1.0$$

and $$0.71 \leq K_2/K_1 \leq 1.42.$$

4 Claims, 1 Drawing Figure

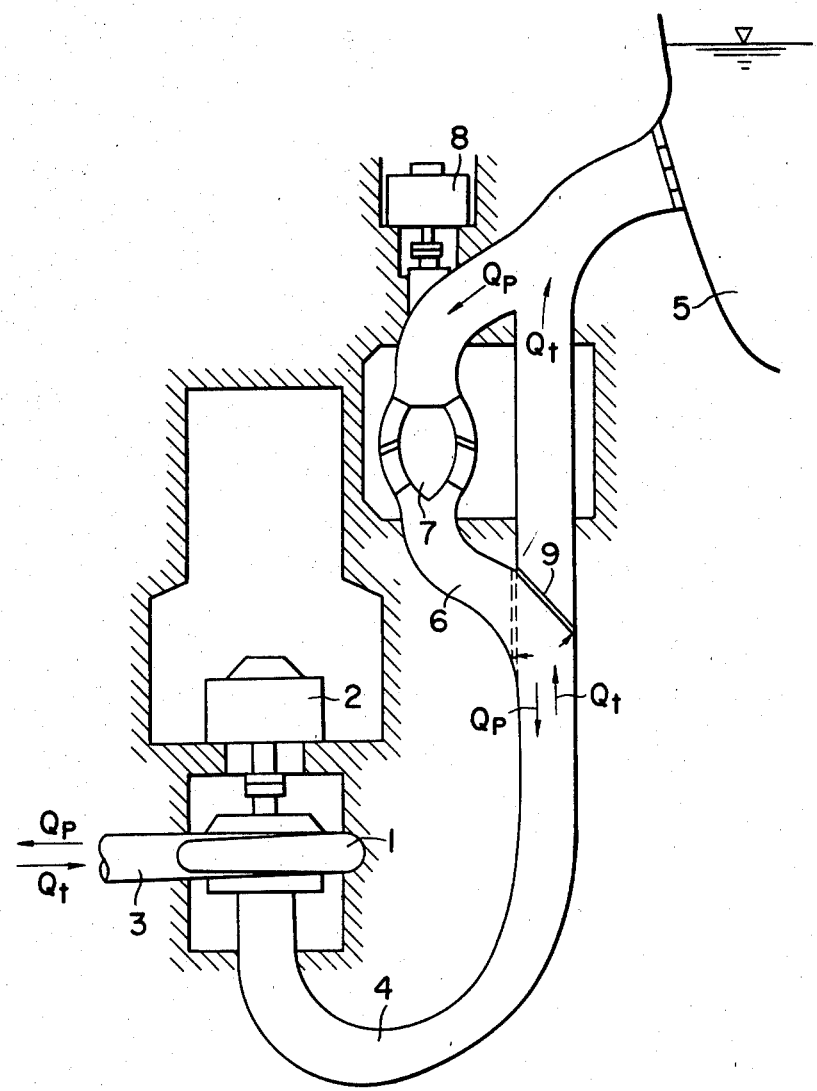

PUMPING UP HYDROELECTRIC POWER PLANT

BACKGROUND OF THE INVENTION

This invention relates to a pumping up hydroelectric power plant utilizing a reversible pump/turbine and a booster pump operable in series when the pump/turbine is operated in the pumping mode.

Recently, pumping up hydroelectric power plants operable under high heads are being constructed widely. However, when the pump/turbine provided therein is of a single speed type, the head under which the pump/turbine is operated at the maximum efficiency in the pumping mode is considerably lower than that in the turbine mode of operation also at the maximum efficiency, and therefore it is found difficult to operate the pump/turbine in both of the two modes at their highest efficiencies under an operating head condition assigned to the pumping up power plant.

In order to overcome this difficulty, there has been proposed and constructed a pumping up hydroelectric power plant wherein a booster pump is further provided in a by-pass portion of the suction side tunnel of the pump/turbine in such a manner that the booster pump is operated in series with the pump/turbine with a portion of the head available at that time assigned to the booster pump during the pumping operation of the pump/turbine.

In such an arrangement of the pumping up hydroelectric power plant, during the pumping operation since the total head of the power plant is shared between the pump/turbine and the booster pump, the actual head under which the pump/turbine is operated in the pumping mode can be reduced by an amount assigned to the booster pump, and therefore the pump/turbine can be operated in both pumping mode and turbine mode at the points of highest efficiencies even under the operating head condition assigned to the power plant, thus improving the total efficiency of the power plant.

However, in the above described construction of the power plant, since the main pump/turbine and the booster pump, inherently having different hydraulic characteristics, are operated in series along a single water passage (or suction side tunnel), the two machines tend to interfere with each other in their transient conditions, thus rendering the operations to be utterly unstable.

For instance, when the pump/turbine and the booster pump having different deceleration characteristics are simultaneously interrupted from the power system, a difference in flow-rate due to the different deceleration characteristics tends to cause severe variation in water pressure in the draft tube.

More specifically, where the deceleration of the booster pump is larger than that of the main pump/turbine, the rotating speed of the latter becomes higher than that of the booster pump after their interruption from the power system, and a reduction in speed of the booster pump is prevented by the water flowing through the main pump/turbine. The operation of the booster pump is thus deviated from the designed condition, tending to cause a separation of water layers (or cavitation) which in turn tends to damage the booster pump and other parts related thereto.

On the other hand, when the deceleration of the main pump/turbine is greater than that of the booster pump, the quantity of water pumped up by the main pump/turbine per unit time is rapidly reduced. However, since the rotating speed of the booster pump is still higher than that of the main pump/turbine, an extremely high pressure is inevitably induced at the delivery side of the booster pump, with a result that the booster pump and other related parts are thereby damaged.

SUMMARY OF THE INVENTION

A primary object of the present invention is to provide a pumping up hydroelectric power plant including a main pump/turbine and a booster pump operable in series along a draft tube, wherein the operations of the main pump/turbine and the booster pump are made stable regardless of the transient conditions of the operations.

Another object of the invention is to provide a pumping up hydroelectric power plant as described above, wherein the operations of the pump/turbine and the booster pump are stabilized without requiring any additional electric circuitry for stabilizing the operations.

According to the present invention, there is provided a pumping up hydroelectric power plant comprising a main pump/turbine having a draft tube, and a booster pump provided in a by-pass conduit of the draft tube, so that the booster pump is operated in series with the main pump/turbine during the pumping operation of the pump/turbine, the improvement wherein the main pump/turbine and the booster pump are constructed to satisfy a relation $$(K_1/K_2)(\bar{y}_2/\bar{y}_1) \approx 1.0$$

wherein
$K_1$: time constant of the rotating part of the pump/turbine,
$K_2$: time constant of the rotating part of the booster pump,
$\bar{y}_1$: average torque exerted to the rotating part of the pump/turbine,
$\bar{y}_2$: average torque exerted onto the rotating part of the booster pump.

The pumping up hydroelectric power plant according to the present invention may otherwise be modified so that the ratio of the time constants $K_1/K_2$ is in a range of from 0.71 to 1.42.

BRIEF DESCRIPTION OF THE DRAWINGS

In the accompanying drawing, the single FIGURE illustrates a general arrangement of a pumping up hydroelectric power plant embodying the present invention.

DESCRIPTION OF THE PREFERRED EMBODIMENT

Referring now to the accompanying drawing there is indicated a pumping up hydroelectric power plant including a single speed reversible pump/turbine 1 directly coupled with a reversible motor/generator 2. A penstock 3 connects the pump/turbine 1 to an upper reservoir (not shown), located above the power plant and a draft tube 4 connects the pump/turbine 1 with a lower (or tailrace) reservoir 5. A booster pump 7 directly coupled with an electric motor 8 is provided in a by-pass conduit 6 extending between two branching points spaced apart along the draft tube 4. A transfer valve 9 is provided at the first branching point near the pump/turbine 1. When the main pump/turbine is operated in the turbine mode, the transfer valve 9 is placed at a position indicated by broken lines shown in the drawing for closing the conduit 6. In this state, water is discharged from the pump/turbine 1 to the lower reservoir 5 through the draft tube 4.

On the other hand, when the pump/turbine 1 is operated in the pumping mode, the transfer valve 9 is shifted to a position indicated by solid lines so that water in the reservoir 5 passes through the by-pass conduit 6, and hence through the booster pump 7, to the suction side of the pump/turbine 1 now operating as a pump.

According to the present invention, the pump/turbine and the booster pump are so constructed that the deceleration characteristics of these machines are equal to each other. More specifically, the pump/turbine and the booster pump are so designed that when the machines are simultaneously disconnected from the power system, the rotating speeds of these machines are simultaneously reduced to zero.

The above described characteristics of the two machines can be obtained where a time constant is assumed as described hereinbelow for the rotating part of each machine inclusive of the rotating part of the driving motor, and the ratio between the time constants for the main pump/turbine and the booster pump is brought into a predetermined range.

Ordinarily, when a hydraulic machine is interrupted from the power source, and the rotating speed thereof is reduced, the equation of motion for the rotating part of the machine inclusive of the driving motor is expressed as $$\frac{dx}{dt} = -\frac{y}{K} \quad (1)$$

wherein
t: time (in sec.)
x: rotating speed (dimensionless) of the rotating part $(N/N_o)$,
y: dimensionless torque acting on the rotating part from outside $(=M/M_o)$,
$N_o$: rated speed of the hydraulic machine (rpm),
N: rotating speed of the hydraulic machine after it has been interrupted from the power system (rpm),
$M_o$: operational torque of the hydraulic machine at the time of the rated operation (kg.m),
M: torque exerted to the rotating part from water (kg.m) after the machine has been interrupted from the power system,
K: time constant (sec.) for the entire rotating parts of th- hydraulic machine inclusive of that of the driving motor $(=\pi \cdot N_o \cdot GD^2/120 \, g \cdot M_o)$.

As is apparent from the above equation (1), the rate of variation in the dimensionless rotating speed of the rotating part with respect to time is varied depending on the dimensionless torque y and the time constant K.

Assuming that the time period from the interrupting instant $x=x_o=1$) to an instant where the rotating speed N of the hydraulic machine is reduced to 0 (x=0) is represented by t, and by subjecting the equation (1) to a definite integration as follows, $$\int_1^0 dx = -\frac{1}{K} \int_0^t y\,dt \quad (2)$$

the following relation can be obtained.

$$K = \int_o^t y\,dt \quad (3)$$

This equation (3) indicates that the time constant K is defined to be a definite integration of dimensionless torque y from the interrupted instant to an instant where the rotating part is brought to standstill.

From equation (3), the mean value $\bar{y}$ of the torque y is expressed as $$\bar{y} = \int_o^t y\,dt/t = \frac{K}{t} \quad (4)$$

It is apparent that the mean value $\bar{y}$ and the time constant K are values specific to each of the hydraulic machines.

Returning now to the arrangement shown in FIGURE, it is assumed that the main pump/turbine 1 and the booster pump 7 are simultaneously disconnected from the power system, and that the values related to the main pump/turbine 1 are designated by characters suffixed with 1, while the values related to the booster pump are designated by characters suffixed with 2. Then, the time periods $t_1$ and $t_2$ required for bringing these two machines from the rated speeds to standstill condition are $$t_1 = K_1/\bar{y}_1 \ldots \quad (5)$$

$$t_2 = K_2/\bar{y}_2 \ldots \quad (6)$$

From these relations, $$t_1/t_2 = (K_1/K_2)(\bar{y}_2/\bar{y}_1) \ldots \quad (7).$$

Ordinarily, hydraulic machines are classified into Francis type, axial-flow type, and a diagonal-flow type. Regardless of whatever types are the two hydraulic machines, the mean values $\bar{y}_1$ and $\bar{y}_2$ of the torques $y_1$ and $y_2$ applied to these machines are different from each other when the "specific speed" of these machines, which is an important factor in machine design, is different.

Furthermore, it has been found that the ratio of these mean values $\bar{y}_1$ and $\bar{y}_2$ for the two machines which are operable in series in an arrangement as shown in the accompanying drawing is advantageously in the following range.

$$(\bar{y}_2/\bar{y}_1) = 0.71 - 1.42 \ldots \quad (8)$$

The lower limit 0.71 corresponds to a combination of the pump/turbine and the booster pump, wherein a greatest possible value is selected for the torque of the pump/turbine against that of the booster pump, while the upper limit 1.42 corresponds to a combination wherein a smallest possible value is selected for the torque of the pump/turbine against that of the booster pump.

From the above described relations (7) and (8), the ratio of the two time constants $K_2/K_1$ causing $t_1=t_2$ is expressed as $$K_2/K_1 = \bar{y}_2/\bar{y}_1 = 1.42 - 0.71 \ldots \quad (9).$$

When it is assumed that $N_{o1}$ and $N_{o2}$ represent rated speeds (rpm) of the pump/turbine and the booster pump respectively; $M_{o1}$ and $M_{o2}$ represent hydraulic torques (kg.m) of the two machines during the rated pumping operations; $GD_1^2$ and $GD_2^2$ represent moment of inertias (kg.m$^2$) of the two machines inclusive of the rotating parts of the driving motors; $\pi$ represents the circumference to diameter ratio of a circle; and g represents an acceleration coefficient of gravity, the time constant $K_1$ of the main pump/turbine is expressed as $$K_1 = \frac{\pi \cdot N_{o1} \cdot GD_1^2}{120 \, g \cdot M_{o1}} \text{ (sec.)}$$

while the time constant $K_2$ of the booster pump is $$K_2 = \frac{\pi \cdot N_{o2} \cdot GD_2^2}{120 \, g \cdot M_{o2}} \text{ (sec.)}$$

Thus by adjusting $GD_1^2$ and $GD_2^2$, the ratio between the time constants $K_1$ and $K_2$ for the main pump/turbine and the booster pump can be brought into a range of from 0.71 to 1.42.

We claim:

1. A method of operating a pumping up hydroelectric power plant comprising a main pump/turbine having a draft tube, and a booster pump provided in said draft tube, so that said booster pump is operated in series with said main pump/turbine during the pumping operation of the pump/turbine, the operation of said main pump/turbine and said booster pump including the step of decelerating said pump/turbine and said booster pump such that the following relations are satisfied:

$$(K_1/K_2)(\bar{y}_2/\bar{y}_1) \approx 1.0$$

and $$0.71 \leq K_2/K_1 \leq 1.42$$

wherein
$K_1$: time constant of the rotating part of the pump/turbine,
$K_2$: time constant of the rotating part of the booster pump,
$\bar{y}_1$: average torque exerted to the rotating part of the pump/turbine,
$\bar{y}_2$: average torque exerted to the rotating part of the booster pump.

2. The method of claim 1, wherein the booster pump is provided in a by-pass conduit of said draft tube, and wherein the method further includes the step of closing said draft tube such that pump fluid passes through said conduit.

3. A pumping up hydroelectric power plant structure comprising a main pump/turbine having a draft tube, a booster pump provided in said draft tube, so that said booster pump is operated in series with said main pump/turbine during the pumping operation of the pump/turbine, and a power system for operating the main pump/turbine and booster pump, said main pump/turbine and said booster pump being constructed to satisfy relations $$(K_1/K_2)(\bar{y}_2/\bar{y}_1) \approx 1.0$$

and $$0.71 \leq K/K \leq 1.42$$

wherein
$K_1$: time constant of the rotating part of the pump/turbine
$K_2$: time constant of the rotating part of the booster pump,
$\bar{y}_1$: average torque exerted to the rotating part of the pump/turbine,
$\bar{y}_2$: average torque exerted to the rotating part of the booster pump,
so that when the main pump/turbine and booster pump are simultaneously disconnected from the power system, the rotating speeds of each pump are simultaneously reduced to zero.

4. A pumping up hydroelectric power plant structure as in claim 3, wherein the booster pump is provided in a by-pass conduit of said draft tube, and means are provided for constraining the pump fluid to pass through said conduit.

* * * * *